United States Patent
Sakamoto et al.

(10) Patent No.: US 6,706,442 B1
(45) Date of Patent: Mar. 16, 2004

(54) ALKALINE STORAGE BATTERY

(75) Inventors: Hiroyuki Sakamoto, Neyagawa (JP); Hidekatsu Izumi, Neyagawa (JP); Yoichi Izumi, Moriguchi (JP); Yoshio Moriwaki, Hirakata (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/806,011

(22) PCT Filed: Oct. 4, 1999

(86) PCT No.: PCT/JP99/05479

§ 371 (c)(1),
(2), (4) Date: Mar. 26, 2001

(87) PCT Pub. No.: WO00/21148

PCT Pub. Date: Apr. 13, 2000

(30) Foreign Application Priority Data

Oct. 7, 1998 (JP) .......................................... 10-284915

(51) Int. Cl.$^7$ ................................................ H01M 4/32
(52) U.S. Cl. ...................... 429/223; 429/224; 429/233; 429/234; 429/235; 429/247; 429/248; 429/218.1
(58) Field of Search .............................. 429/122, 218.1, 429/223, 224, 233, 234, 235, 247, 248

(56) References Cited

U.S. PATENT DOCUMENTS

| | | | |
|---|---|---|---|
| 6,156,456 A | * 12/2000 | Izumi et al. | 429/223 |
| 6,218,046 B1 | * 4/2001 | Tanigawa et al. | 429/223 |
| 6,225,004 B1 | * 5/2001 | Hayashi | 429/223 |
| 6,251,538 B1 | * 6/2001 | Seyama et al. | 429/223 |
| 6,255,019 B1 | * 7/2001 | Sakamoto et al. | 429/223 |
| 6,479,189 B1 | * 11/2002 | Ogasawara et al. | 429/223 |
| 6,521,377 B2 | * 2/2003 | Ogasawara et al. | 429/223 |
| 6,537,700 B1 | * 3/2003 | Ovshinsky et al. | 429/223 |

FOREIGN PATENT DOCUMENTS

| | | |
|---|---|---|
| CN | 1135663 A | 11/1998 |
| EP | 0 383 161 | 8/1990 |
| EP | 0 477 461 | 4/1992 |
| EP | 0 752 726 | 1/1997 |
| JP | 62-51150 | 3/1987 |
| JP | 08-222215 | 8/1996 |
| JP | 08-222216 | 8/1996 |
| JP | 08-236110 | 9/1996 |
| JP | 9-330694 | 12/1997 |
| JP | 10-149821 | 6/1998 |
| WO | WO 98/20570 | 5/1998 |

* cited by examiner

Primary Examiner—Bruce F. Bell
(74) Attorney, Agent, or Firm—McDermott, Will & Emery

(57) ABSTRACT

An alkaline storage battery comprising an improved separator and having a high energy density and an excellent cycle life characteristic is disclosed. The alkaline storage battery in accordance with the present invention comprises a positive electrode including a nickel hydroxide material as an active material, a negative electrode, a separator and an electrolyte, wherein the nickel hydroxide material of the positive electrode contains at least Mn or is disposed with a coating of a cobalt oxide material on its surface and wherein the separator carries particles of a hydrophilic and insulating metal oxide directly attached to its surface. The metal oxide particle is preferably at least one selected from the group consisting of titanium oxide, aluminum oxide, zirconium oxide, potassium titanate, tungsten oxide, and zinc oxide. The most preferable one is anatase type $TiO_2$.

11 Claims, 1 Drawing Sheet

ALKALINE STORAGE BATTERY

TECHNICAL FIELD

The present invention relates to an alkaline storage battery of high capacity density exhibiting superior cycle stability.

BACKGROUND ART

With the recent development of semiconductor technology, compact and light-weight multifunctional electric appliances have been developed progressively with rapid realization of compact personal equipment of portable type represented by note-book type personal computers. Therefore, there is an increasing demand even for the alkaline storage battery that has a wide application as the power source of such equipment to have a compact and light-weight design.

Up to date, the main active material for the positive electrode of alkaline storage battery has been nickel oxide (NiOOH). Concerning the electrode substrate per se, industrialization of an electrode made of a three-dimensional foamed nickel porous material with a higher porosity (95%) into which a nickel oxide powder is filled at a high density (foamed metal type electrode) in place of a sintered type electrode using a conventional sintered substrate (Japanese Examined Patent Publication No. Sho 62-54235; U.S. Pat. No. 4,251,603; etc.) has led to drastic improvements of the energy density of such nickel positive electrode.

To the realization of high energy density nickel positive electrode, improved manufacturing method of the nickel oxide powder as the active material is an important contributory technology. Any conventional manufacturing method of the nickel oxide powder has adopted a process where an aqueous nickel salt solution is reacted with an aqueous alkaline solution such as sodium hydroxide to precipitate nickel hydroxide, which is then aged to grow crystals and subsequently ground with some mechanical grinding method. This method has drawbacks that it is not only tedious but also does not readily produce a high packing density due to irregular shapes of the powders obtained by this method. Therefore, an alternative manufacturing method was proposed that reacts an aqueous nickel salt solution with ammonia to form an ammonium complex of nickel with which an aqueous alkaline solution is further reacted to grow nickel hydroxide (Japanese Examined Patent Publication No. Hei 4-80513). This method has enabled not only cost-effective continuous production of nickel hydroxide but also high density packing because of the resembling shape of the obtained powders to a sphere.

However, the use of high density particles of a large size obtained by this method which have grown up to a size of dozens of $\mu$m as an active material produces a problem of impairment of charge/discharge efficiency due to low electronic conductivity of the active material. This problem has been coped with by an improvement to supplement electronic conductivity by adding either Co or its oxide, or Ni, etc. to the active material (Japanese Examined Patent Publication No. Sho 61-37733; Electrochemistry, Vol. 54, No. 2, p. 159 (1986); Power Sources, Vol. 12, p. 203 (1988)). Other improvements have also been attempted to incorporate an additional metallic element other than Ni, such as Cd or Co, into the active material to increase the charge/discharge efficiency (Japanese Examined Patent Publication No. Hei 3-26903; Japanese Examined Patent Publication No. Hei 3-50384; Electrochemistry, Vol. 54, No. 2, p. 164 (1986); Power Sources, Vol. 12, p. 203 (1988)). Furthermore, because of a demand for a cadmium-free battery from the aspect of environment, there are a proposal of Zn as an exemplary substitution metallic element for Cd on the one hand and a proposal of incorporation of three elements, Co, Zn and Ba, on the other hand (U.S. Pat. No. 5,366,831). Such incorporation of different metallic elements into nickel oxide and forming a solid solution in order to realize a charge/discharge characteristic of high efficiency is a long known art (Japanese Laid-Open Patent Publication No. Sho 51-122737, etc.)

Improvements in the shape, composition and additive of the electrode substrate and the active material as discussed above have drastically increased the energy density of the positive electrode and, at present, even such a positive electrode as having an energy density of about 600 mAh/cc has become commercially practical. As mentioned previously, however, there is an increasingly expanding tendency of the demand for the alkaline storage battery to have a more increased energy density for use as a power source of compact portable equipment. In order to realize more increased battery energy density, approaches from various aspects including positive electrode, negative electrode, electrolyte, separator and their structure may be contemplated. Concerning the negative electrode, by an actual use of metal hydride with high energy density (Power Sources, vol. 12, p. 393 (1988)) in place of the conventional cadmium negative electrode, a volume energy density doubling or more than that of the positive electrode has been attained. Moreover, concerning the battery structure, high energy density has been realized rapidly with the technical developments of thin separators, high density packing of active material into electrode substrate, etc., which have now almost reached their limits.

Under the circumstances, in order to realize even higher energy density, realization of a higher energy density of the positive electrode which occupies almost half the volume of a battery has been taken as playing a significant role as the most effective elementary art.

Estimated approaches for realization of improved energy density of the positive electrode may include an improvement of the active material tap density, a reduction of the amounts of any additive and a reduction of metal contents in the foamed nickel substrate. These technologies, however, are almost reaching their limits. This necessitates an attempt to modify the active material per se to improve its reactivity and reaction order. The current positive electrode active material nickel oxide is $\beta$-Ni(OH)$_2$ (bivalent oxide) upon production of a battery which has been considered to develop a reaction of one electron exchange (utilization= 100%) with $\beta$-NiOOH (trivalent) during normal charge/discharge operation. When exposed to overcharge, however, $\beta$-NiOOH in charged state can be partially oxidized to $\gamma$-NiOOH (3.5- to 3.8-valent) which is a high order oxide. Such $\gamma$-NiOOH has been known to be at least a nonstoichiometric material of disordered crystal structure (J. Power Sources, Vol. 8, p. 229 (1982)). Conventionally, the $\gamma$-NiOOH is electrochemically inactive and induces not only reductions of voltage and capacity but also various hazardous events such as contact failure of the active material with a conductive material or the substrate due to expansion of electrode volume resulting from a broadening interlayer space, separation of the active material from the substrate, depletion of the electrolyte due to intake of water molecules by the active material. This has led to attempts of various measures to best suppress generation of undesirable $\gamma$-NiOOH.

However, in order to realize a higher energy density by using a nickel oxide-based active material, a good use of the high order oxide γ-NiOOH is of much importance. For such purpose, there is a proposed material having a similar structure to that of α-hydroxide wherein Ni is partially replaced with a different metal such as Mn (III), Al (III) or Fe (III) and anions and water molecules are incorporated between the layers (J. Power Sources, Vol. 35, p. 294 (1991); U.S. Pat. No. 5,569,562; Japanese Laid-Open Patent Publication No. Hei 8-225328; and others). It has been considered that this oxide readily develops charge/discharge reaction with a high order oxide having a mimicking structure to that of γ-NiOOH. Another proposal of using charge/discharge between α-phase and γ-phase has been disclosed in the U.S. Pat. No. 5,348,822. In fact, however, this oxide is a material having wide interlayer gaps and an extremely bulky density, making it difficult to perform high density packing. This may indicate poor practical utility of this oxide.

As an alternative, it has been attempted to provide a coating of a cobalt oxide on the active material surface to improve electronic conductivity and charge/discharge efficiency in order to realize high energy density of the positive electrode. Although different from the above-mentioned technique that uses reaction up to the γ-phase, this technique can produce marked improvements in the utilization and positive electrode energy density, compared with the conventional positive electrode made of a mere mixture with cobalt or cobalt oxide.

To the contrary, the present inventors have newly discovered an active material that develops charge/discharge reaction with the high order oxide γ-NiOOH (Abstracts of Autumn Congress of Association of Electrochemistry, p. 181 (1995)) and noted it as a novel active material. As one example, the inventors proposed modification or reformation of nickel oxide by incorporating therein an additional different metallic element for the purpose of high density and high order reaction as one example (Japanese Laid-Open Patent Publication No. Hei 10-149821). Incorporation of Mn into nickel oxide in particular enabled marked improvement of the charge/discharge efficiency with the best use of γ-phase. The present inventors also elucidated that control of the valence of Mn in the nickel oxide material facilitates high order reaction larger than a valence of 1.2 and proposed a synthesizing method for realizing high density (Japanese Laid-Open Patent Publication No. Hei 10-011071; Japanese Laid-Open Patent Publication No. Hei 10-053225). In addition to the present inventors, some inventors have proposed such nickel hydroxide that can cycle between β-phase and γ-phase reversibly (WO 98/20570).

On the other hand, in order to improve various characteristics of alkaline storage battery including higher energy density, better cycle life and so on, it is very important to improve the separator. The characteristics required for the separator for use in alkaline storage battery may include better affinity for any electrolyte, excellent rate of absorption and retention capacity of electrolyte, superior alkali resistance to tolerate repeated charge and discharge, operations for a long time, and good gas permeability generating in the battery. To date, the separator for use in alkaline storage battery has been made of a nonwoven fabric sheet comprising polyamide fibers, polyolefin fibers, etc. Particularly, the polyolefin fiber, which reduces self-discharge of the battery and exhibits better alkali resistance at use in a high temperature range, has been adopted widely. However, the separator made of a polyolefin fiber sheet is inferior in affinity for any electrolyte and poor in electrolyte retention thereby manifesting a depleting tendency of the electrolyte when it is exposed to repeated charge and discharge for a long time. Therefore, treatment of such polyolefin fiber nonwoven fabric sheet to impart hydrophilicity thereto has been studied. Exemplary treatments include: (a) oxidation using fuming sulfuric acid or concentrated sulfuric acid; (b) graft treatment with a monomer having a hydrophilic group; (c) plasma treatment. Any of these treatments can improve electrolyte retention markedly and facilitates reduction of electrolyte depletion comparatively. There is also a proposal to fix an ion exchange fine powder onto the separator surface (Japanese Laid-Open Patent Publication No. Hei 9-330694).

As the aforementioned ion exchange fine powder, any ion exchange resin, metal oxide or hydroxide or their inorganic salts have been considered to prove effective. Such ion exchange fine powder which has a high ion exchanging ability can adsorb and capture metallic ions such as manganese ion, iron ion, aluminum ion, etc. as well as ammonium ion, chloride ion, nitrate ion, sulfate ion, etc. all of which have been taken as impairing factors of battery performance and can well preserve an alkaline electrolyte. Therefore, the separator fixed with the ion exchange fine powder has been considered to enable alleviation of self-discharge by the shuttle effect, reduction of electrolyte depletion thereby realizing a long life battery. According to this proposal, the use of a binder resin for fixing the ion exchange fine powder onto the separator prevents physical separation or chemical decomposition of the ion exchange fine powder as a result of which the effect can be maintained for a long time.

As discussed before, attempts have been made to improve charge/discharge efficiency and elevate the reaction order with the use of nickel hydroxide with a coating of a cobalt oxide material or a solid solution or eutectic mixture nickel hydroxide material with Mn incorporated therein as the positive electrode active material. However, the use of cobalt oxide-coated nickel hydroxide is prone to produce γ-phase in a competitive manner with oxygen evolution reaction at the end of charge operation due to repeated charge and discharge, compared to the positive electrode prepared by simply mixing an additive cobalt oxide with nickel hydroxide, although it improves charge/discharge efficiency and realizes high energy density. As described previously, the γ-phase is prone to be accumulated inside the electrode during repeated charge/discharge operations, because it is electrochemically inactive and difficult to be discharged. This results in swelling of the electrode and an increase of the specific surface area of the electrode as well as intake of the electrolyte contained in the separator by the positive electrode, which produces another problem of easy development of electrolyte depletion. This in turn produces a problem of slightly poor cycle stability of the resultant battery. To the contrary, the solid solution or eutectic mixture nickel hydroxide material with Mn incorporated therein uses the reactions (from the very initial charge/discharge cycle) up to the γ-phase during normal charge and discharge. As a result, the active material is swollen and constricted markedly during a charge/discharge cycle, resulting in an increasing tendency of the specific surface area of the electrode. Therefore, even when this active material is used, the electrolyte in the separator readily moves into the positive electrode which also produces a problem of easy development of electrolyte depletion. Therefore, this nickel hydroxide has a drawback of slightly poor cycle stability compared to the conventional nickel hydroxide in which generation of γ-phase is suppressed and about one electron exchange can proceed.

A primary object of the present invention is to provide an alkaline storage battery having a high energy density and an excellent cycle life characteristic from which the above-mentioned various problems have been cancelled by improving the separator.

DISCLOSURE OF INVENTION

The present invention provides an alkaline storage battery comprising a positive electrode including a nickel hydroxide material as an active material, a negative electrode, a separator and an electrolyte, wherein the nickel hydroxide material of the positive electrode contains at least Mn or is disposed with a coating of a cobalt oxide material on its surface and wherein the separator carries particles of a hydrophilic and insulating metal oxide directly attached to its surface with no aid of binder.

Here, the metal oxide particle is preferably at least one selected from the group consisting of titanium oxide, aluminum oxide, zirconium oxide, potassium titanate, tungsten oxide, and zinc oxide, and most preferably anatase type $TiO_2$.

It is desirable for the metal oxide particle to have a mean size of 0.01 to 0.1 $\mu$m.

It is also preferable for the metal oxide particle to be carried on the separator in an amount of 0.1 to 20 wt % with reference to the separator weight.

BEST MODE FOR CARRYING OUT THE INVENTION

Figure 1:
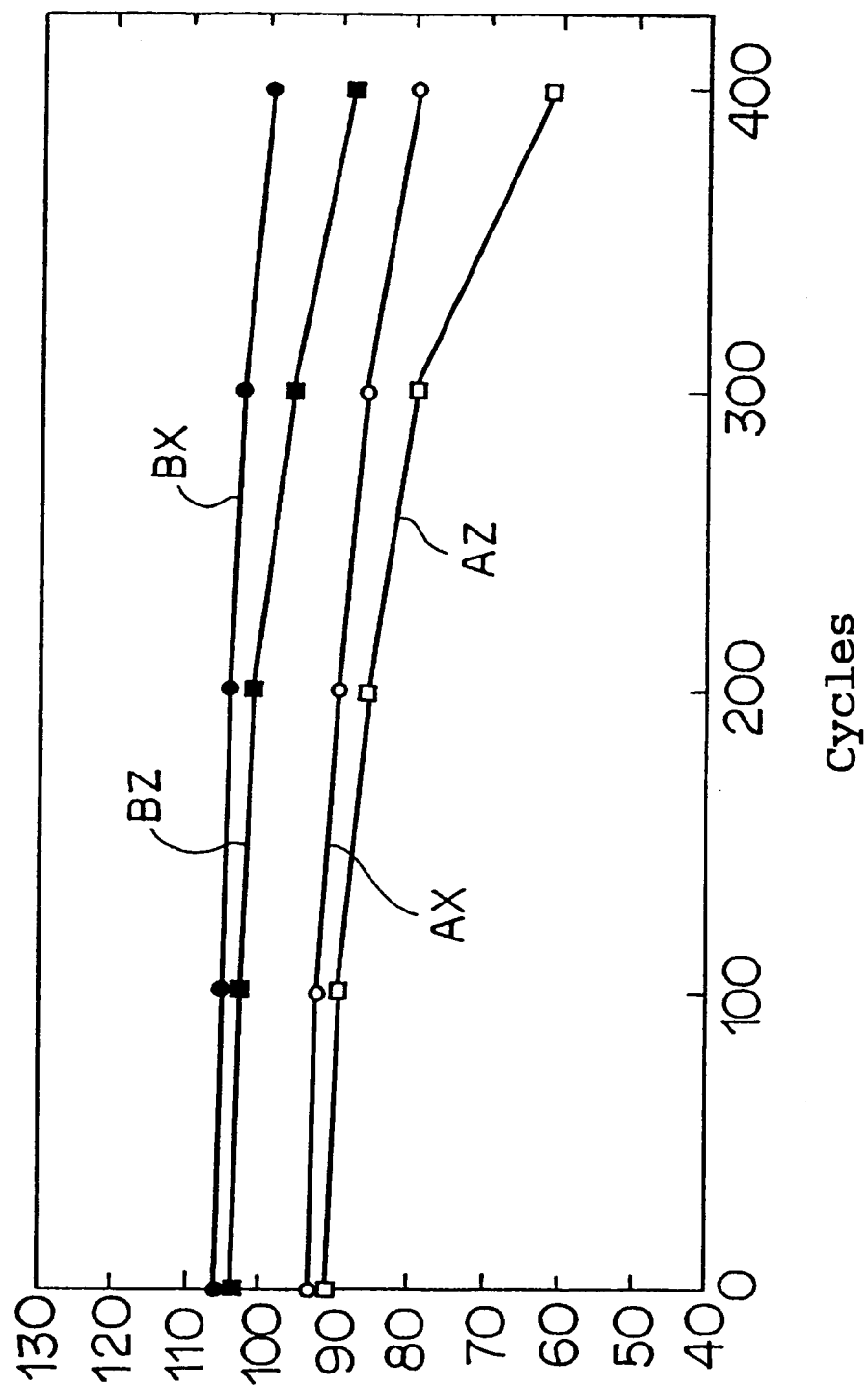
FIG. 1 is a graph illustrating the relationship between the charge/discharge cycle number and active material utilization in a nickel-metal hydride storage battery in accordance with one example of the present invention and that of a comparative example.

The positive electrode active material in accordance with the present invention is a nickel hydroxide material having a coating of a conductive cobalt oxide material or a nickel hydroxide material containing Mn. The former increases conductivity thereby improving charge/discharge efficiency remarkably. This enables an increase of utilization thereby facilitating realization of a high energy density positive electrode for alkaline storage battery. The latter, on the other hand, permits the use of reactions up to $\gamma$-phase with a reaction order exceeding one electron, thereby facilitating realization of a high energy density positive electrode for alkaline storage battery. The former nickel hydroxide material may further incorporate Mn and/or a different metallic element. Alternately, the latter nickel hydroxide material may further incorporate a different metallic element or have a coating of a cobalt oxide material on its surface.

The nickel hydroxide material incorporating Mn or an additional different metallic element applicable to the present invention has been disclosed in, for example, EP-A-0833 397, and the nickel hydroxide material having a coating of a cobalt oxide material directly attached to its surface has been disclosed in, for example, EP-A-0851 516. The above documents are incorporated herein by reference in their entirety.

The separator of the present invention carries particles of a hydrophilic and insulating metal oxide directly attached to its surface. The metal oxide particle per se has high hydrophilicity and when this particle is carried on the separator surface, then the separator can have a markedly improved electrolyte retention. Since the metal oxide particle increases surface area of the separator, the separator can also be improved in electrolyte retention in this regard. It is of course possible to carry the metal oxide particle on the separator by means of a binder; however, directly carrying it on the separator without use of any binder produces a more prominent effect. Since the use of a binder for carrying the metal oxide particle is more likely to reduce the gas permeability, it is more preferable not to use any binder. Directly carrying the metal oxide particle with no aid of binder also carries a concern of physical separation of the metal oxide particle. However, in an experiment by the present inventors, the event of separation was observed only occasionally even when charge/discharge operation was repeated for a long time. Although the detailed reason for this remains unknown, it is estimated that the binding (adsorbing) force between the metal oxide particle surface and the separator surface may be strong.

Direct attachment of the metal oxide particles to the separator surface can be achieved by, for example, immersing the separator in a dispersion of metal oxide fine powders in alcohol and drying it to volatilize the alcohol. At that time, a medium having an affinity for the separator material such as polyolefin fiber, for example, should be used as the dispersion medium of the metal oxide fine powder.

Of various metal oxides, the use of ones exerting superior alkaline resistance at high temperatures facilitates further improvement of the cycle life characteristic at high temperatures. These actions help to suppress electrolyte depletion which will result from repeated charge/discharge cycles when the positive electrode active material of the present invention is used, thereby retaining the improving effect of the active material utilization.

As the metal oxide particle, at least one selected from the group consisting of titanium oxide, aluminum oxide, zirconium oxide, potassium titanate, tungsten oxide, and zinc oxide is desirable. Any of these oxides remains relatively stable in aqueous alkaline solution and exhibits high hydrophilicity. Of them, anatase type $TiO_2$ is particularly preferred. It is also possible to impart hydrophilicity to the separator fiber by irradiating a light having an energy over the band gaps of the above-listed oxides, for example, ultraviolet radiation. In other words, an electron present in the valence electron band is excited to move to the conduction band which results in formation of a positive hole in the valence electron band. As a result, the photocarrier (positive hole-excited electron) reacts with the water or oxygen adsorbed onto the oxide surface to produce superoxide species. The superoxide species then oxidize an end group of the separator fiber to change it to a hydrophilic group. Since the greater the surface area of the metal oxide particle with hydrophilicity, the more prominent the above-mentioned effect, smaller particle sizes are preferred. The lower limit of the metal oxide particle size obtained by the conventional liquid phase or gas phase method is 0.01 $\mu$m or so. Therefore, a desired mean particle size is 0.01 to 0.1 $\mu$m. A carried amount of metal oxide particle on the separator less than 0.1 wt % with reference to the separator weight produces almost no effect, and a carried amount exceeding 20 wt % decreases an absolute volume of electrolyte retention and accelerates self-discharge of the battery. Therefore, desired carried amounts are 0.1 to 20 wt %.

In the following, the present invention will be described by way of examples but the present invention is not limited to those examples.

EXAMPLE 1

First, a method for synthesizing nickel hydroxide having a coating of a cobalt oxide on its surface as the positive electrode active material will be described.

An aqueous 2.4 mol/l NiSO$_4$ solution, an aqueous 5.52 mol/l NaOH solution and an aqueous 4.8 mol/l NH$_3$ solution were prepared which were consecutively supplied to a reaction vessel maintained at 40° C. The supply rate of each solution to the reaction vessel was controlled to make the mixed solution in the reaction vessel have a pH in a range of 11.5 to 12.5. And, a stirrer set in the reaction vessel was rotated at a constant rate so that all the aqueous solutions could be constantly mixed in the reaction vessel homogeneously. Subsequently, when the solution in the reaction vessel had a constant pH and the concentration of the nickel salt and that of the nickel hydroxide particle as produced reached a constant fixed value, the suspension overflowing the reaction vessel was collected and precipitates were separated therefrom by decantation. The precipitates thus separated were rinsed with water and then the precipitated nickel hydroxide particles were dried in the atmosphere.

The resultant nickel hydroxide particles were spherical particles having a mean size of 10 μm. X-ray diffraction pattern also confirmed that the nickel hydroxide was single phase β-Ni(OH)$_2$.

Next, the nickel hydroxide particles were placed in water onto which an aqueous 0.1 mol/l CoSO$_4$ solution, an aqueous 0.23 mol/l NaOH solution and an aqueous 0.4 mol/l NH$_3$ solution were dropped concurrently while stirring to deposit a cobalt oxide on each surface of the nickel hydroxide particles gradually. Subsequently, the suspension containing the particles was filtered, rinsed and dried to obtain a positive electrode active material A. The amount of the coating layer which covers the particles of the nickel hydroxide was calculated based on the result of ICP spectrochemical analysis and composition of the particle in the active material. The result showed that the amount of coating was 7 wt % on the basis of hydroxide, with reference to the nickel hydroxide weight.

Next, a method for synthesizing nickel hydroxide containing Mn as the positive electrode active material will be described.

An aqueous solution of 2.16 mol/l NiSO$_4$ plus 0.24 mol/l MnSO$_4$, an aqueous 5.52 mol/l NaOH solution and an aqueous 4.8 mol/l NH$_3$ solution were prepared which were consecutively supplied to a reaction vessel maintained at 40° C. The supply rate of each solution to the reaction vessel was controlled to make the mixed solution in the reaction vessel have a pH in a range of 11 to 12.5. At the same time, Ar gas was supplied to the solution in the reaction vessel consecutively at a flow rate of 800 ml/min to hold the concentration of the dissolved oxygen in the solution at 0.05 mg/l or less. And, a stirrer set in the reaction vessel was rotated at a constant rate so that all the aqueous solutions and the gas could be constantly mixed in the reaction vessel homogeneously. Subsequently, when the solution in the reaction vessel had a constant pH and the concentration of the metal salt and that of the nickel hydroxide particle as produced reached a constant fixed value, the suspension overflowing the reaction vessel was collected and precipitates were separated therefrom by decantation. After rinsed with water, the precipitated hydroxide powders wetted with water were dried at 80° C. for 72 hours in the air which gave an active material B.

The resultant active material particles were spherical particles having a mean size of 10 μm. ICP spectrochemical analysis confirmed that the metallic element ratio in the particle was Ni:Mn=9:1 (atomic ratio). Additionally, the total valence of all the metals was determined by iodometric titration. Calculation of mean valence of Mn based on the obtained value showed a valence of 3.5. Furthermore, X-ray diffraction pattern confirmed the presence of single phase β-Ni(OH)$_2$. Observation of a correlation of the mean valence or content of Mn with the lattice constant (Vegard's rule) confirmed incorporation of Mn by being partially substituted for Ni.

The active materials A and B thus produced were used respectively to produce batteries.

First, to 100 g of the active material A, 2 g of a yttrium oxide powder and 30 g of water were added and kneaded into a paste. Separately, to 93 g of the active material B, 7 g of a cobalt hydroxide powder, 2 g of a yttrium oxide powder and 30 g of water were added and kneaded into a paste. Each of the pastes was filled into a foamed nickel substrate having a porosity of 95%, dried and molded under pressure into a nickel positive electrode plate. The positive electrode plate thus obtained was cut to a predetermined size to which an electrode lead was spot-welded to produce a nickel positive electrode having a theoretical capacity of 1,300 mAh. The capacity density of the nickel electrode shown here was calculated assuming that Ni in the active material permits a reaction of one electron exchange.

A known negative electrode for use in alkaline storage battery was used as the negative electrode. Here, a negative electrode made of a hydrogen storage alloy MmNi$_{3.55}$Co$_{0.75}$Mn$_{0.4}$Al$_{0.3}$ was used. The hydrogen storage alloy of desired composition was obtained by mixing Mm, Ni. Co, Mn and Al at a desired ratio and melting them in an arc furnace. The alloy mass was mechanically ground in an inert gas atmosphere to make a powder having a particle size of 30 μm. The alloy powder was mixed with water and a binder carboxymethyl cellulose and kneaded into a paste. The resultant paste was filled under pressure into an electrode support to produce a hydrogen storage alloy negative electrode plate. The negative electrode plate was cut to a predetermined size to make a negative electrode having a capacity of 2,000 mAh.

A commonly used polypropylene nonwoven fabric treated with sulfonation (sulfonated polypropylene nonwoven fabric of 150 μm thick weighing 60 g/m$^2$) was used for the separator. The separator further underwent the following treatment.

First, an exemplary method for producing a separator carrying a metal oxide particle will be described. Anatase type TiO$_2$ particles having a mean size of 0.05 μm were dispersed in ethanol by ultrasound irradiation. The above-mentioned nonwoven fabric was immersed in the dispersion and taken up, followed by drying. This manipulation was repeated several times which gave a separator X carrying about 5 wt % TiO$_2$ fine particles.

A spiral electrode group was produced by placing the separator X between the two electrodes. The electrode group was placed in a battery case and injected with 2.2 ml of an electrolyte of an aqueous 9 mol/l KOH solution. Then, an opening of the battery case was tightly closed using a sealing plate with a safety valve operating at a pressure of about 20 kgf/cm$^2$, which gave a cylindrical AA size sealed nickel-metal hydride storage battery.

COMPARATIVE EXAMPLE 1

A cylindrical AA size sealed nickel-metal hydride storage battery was produced in the same manner as in Example 1, except for the use of the sulfonated polypropylene nonwoven fabric Z as the separator.

Sealed batteries including the positive electrode active material A and the separator X of Example 1 or the separator Z of the comparative example were named AX and AZ, respectively, and those sealed batteries including the positive electrode active material B and the separator X of Example 1 or the separator Z of the comparative example were named BX and BZ, respectively.

These batteries were evaluated for their characteristics as follows. First, a charge/discharge cycle composed of a charge at a current of 130 mA for 18 hours and a discharge at a current of 260 mA until the battery voltage dropped down to 1.0 V was repeated at 20° C., and after the discharge capacity was stabilized, another charge/discharge cycle composed of a charge at a current of 0.6 A for 3.0 hours and a discharge at a current of 0.6 A until the battery voltage dropped down to 0.8 V was repeated at 45° C. The discharged capacity was measured at that time to examine the relationship between the charge/discharge cycle and the active material utilization. The active material utilization was calculated based on an actual discharge capacity to the theoretical capacity, by defining the capacity at one electron reaction of nickel as theoretical capacity.

FIG. 1 is a graph illustrating the relationship between the charge/discharge cycles and the active material utilization in each battery, showing the result of evaluation. The figure indicates that whereas the batteries including the separator Z of the comparative example are decreased in active material utilization after 300 cycles, the batteries including the separator X of the example show almost no decreases in active material utilization even after 400 cycles.

EXAMPLE 2

Cylindrical AA size sealed nickel-metal hydride storage batteries were produced in the same manner as in Example 1, except that the separator was produced by varying the amount of $TiO_2$ in the dispersion or the number of immersing the separator in the dispersion to make a carried amount of $TiO_2$ fine particles 0 to 30 wt % to the separator, and examined for the relationship between the charge/discharge cycles and the active material utilization. The result showed that an amount of 0.1 wt % or more of $TiO_2$ carried on the separator with reference to the separator weight had an improving effect of the cycle stability as had in Example 1. It was also observed that an amount more than 20 wt % of $TiO_2$ carried with reference to the separator produced a decreasing tendency of the cycle stability. Although the details remain unknown, this phenomenon was considered to have resulted from a decrease in absolute volume of electrolyte retention due to the carried fine particles. Therefore, a preferred carried amount of $TiO_2$ is 0.1 to 20 wt % with reference to the separator weight.

EXAMPLE 3

Cylindrical AA size sealed nickel-metal hydride storage batteries were produced in the same manner as in Example 1, except that the mean size of $TiO_2$ fine particles carried on the separator was varied in a range of 1 μm or less, and examined for the relationship between the charge/discharge cycles and the active material utilization. A tendency was observed that the less the mean particle size, the more prominent the improving effect of cycle stability. It was observed, however, that a mean particle size larger than 0.1 μm decreased the improving effect of cycle stability slightly. Therefore, a preferred mean size of the $TiO_2$ fine particle is 0.1 μm or less.

In the foregoing Examples 1–3, although nickel hydroxide having a coating of a cobalt hydroxide on its surface was used as the active material, a similar effect was identified even when a different metallic element was incorporated into the nickel hydroxide inside the active material or into the cobalt hydroxide on the surface. Furthermore, an active material having a coating of a cobalt compound layer formed by oxidizing the above-mentioned cobalt hydroxide also offered an identical effect. Nickel hydroxide incorporated with Mn was also used as the active material, but when further incorporation of an additional metallic element also produced an identical effect. As the metal oxide to be carried on the separator, although anatase type $TiO_2$ was used, other titanium oxide, or aluminum oxide, zirconium oxide, potassium titanate, tungsten oxide or zinc oxide also produced a similar effect.

Industrial Applicability

As discussed above, the present invention can produce an alkaline storage battery which can maintain a high utilization for a long time. Therefore, it is possible to provide an alkaline storage battery which is improved in energy density and cycle life characteristic.

What is claimed is:

1. A nickel metal-hydride storage battery comprising a positive electrode including a nickel hydroxide material as an active material, a negative electrode, a separator and an electrolyte, wherein said nickel hydroxide material of said positive electrode contains at least Mn or is disposed with a coating of a cobalt oxide material on its surface and wherein said separator carries particles of a hydrophilic and insulating metal oxide directly attached to its surface with no aid of binder.

2. The nickel metal-hydride storage battery in accordance with claim 1, wherein said metal oxide particle is at least one selected from the group consisting of titanium oxide, aluminum oxide, zirconium oxide, potassium titanate, tungsten oxide, and zinc oxide.

3. The nickel metal-hydride storage battery in accordance with claim 2, wherein said metal oxide particle is anatase type $TiO_2$.

4. The nickel metal-hydride storage battery in accordance with claim 2, wherein said metal oxide particle has a mean size of 0.01 to 0.1 μm.

5. The nickel metal-hydride storage battery in accordance with claim 2, wherein said metal oxide particle is carried on said separator in an amount of 0.1 to 20 wt % with reference to the separator weight.

6. The nickel metal-hydride storage battery in accordance with claim 1, wherein said metal oxide particles have been attached to the separator by immersing the separator in a dispersion of the metal oxide particles in a medium having an affinity for the separator material and subsequently drying it.

7. The nickel metal-hydride storage battery in accordance with claim 6, wherein said medium is an alcohol.

8. The nickel metal-hydride storage battery in accordance with claim 1, wherein said separator includes hydrophilic portions.

9. The nickel metal-hydride storage battery in accordance with claim 8, wherein said hydrophilic portions are formed by irradiating a light having an energy over the band gaps of said metal oxide particle.

10. The nickel metal-hydride storage battery in accordance with claim 9, wherein said light includes ultraviolet radiation.

11. The nickel metal-hydride storage battery in accordance with claim 1, wherein said active material shows a utilization exceeding 100% at an initial cycle.

* * * * *

UNITED STATES PATENT AND TRADEMARK OFFICE
CERTIFICATE OF CORRECTION

PATENT NO.    : 6,706,442 B1
DATED         : March 16, 2004
INVENTOR(S)   : Hiroyuki Sakamoto et al.

Page 1 of 1

It is certified that error appears in the above-identified patent and that said Letters Patent is hereby corrected as shown below:

<u>Title page,</u>
Item [56], References Cited, FOREIGN PATENT DOCUMENTS, please change the publication date of the Chinese reference "1135663 A" from "11/1998" to -- 11/1996 --.

Signed and Sealed this

Fourteenth Day of September, 2004

JON W. DUDAS
*Director of the United States Patent and Trademark Office*